No. 740,775. PATENTED OCT. 6, 1903.
F. H. PARDON.
FISH HOOK.
APPLICATION FILED JUNE 27, 1902.
NO MODEL.

Witnesses
Inventor:
Frank H. Pardon,
by Joseph L. Atkins
Attorney.

No. 740,775. Patented October 6, 1903.

UNITED STATES PATENT OFFICE.

FRANK H. PARDON, OF OWENSBORO, KENTUCKY.

FISH-HOOK.

SPECIFICATION forming part of Letters Patent No. 740,775, dated October 6, 1903.

Application filed June 27, 1902. Serial No. 113,502. (No model.)

*To all whom it may concern:*

Be it known that I, FRANK H. PARDON, of Owensboro, in the county of Daviess, State of Kentucky, have invented certain new and useful Improvements in Fish-Hooks, of which the following is a complete specification, reference being had to the accompanying drawings.

The object of my invention is to produce an improved fish-hook of the kind shown in my United States Letters Patent No. 668,658, issued to me February 26, 1901, but in which the gaff-hook is actuated by a spring, the spring being so constructed and disposed as to present by reason of its location and ready renewability distinct advantages in composite hooks of the spring-actuated class.

Figure 1:
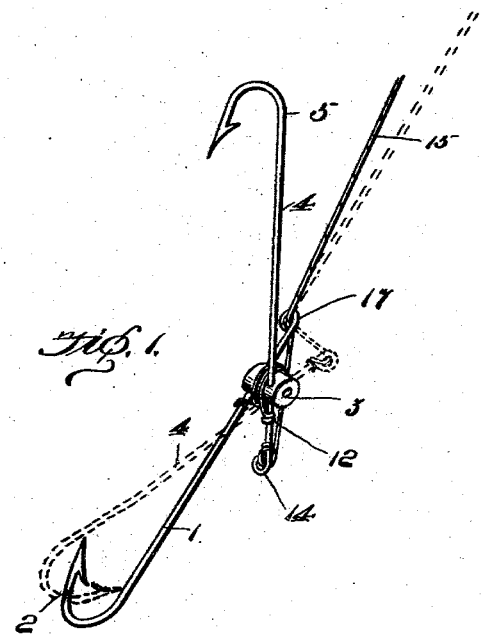
Figure 2:
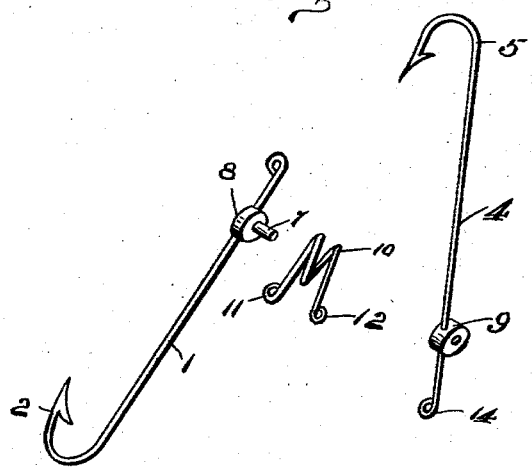

In the accompanying drawings, Figure 1 is a side elevation of my device complete, the gaff-hook being shown in full lines in the set position and in dotted lines in the closed position. Fig. 2 illustrates in perspective a group of the several parts of my hook disassembled.

Referring to the numerals on the drawings, 1 indicates the shank, and 2 the barbed end of that which I shall designate the "pendent hook," and 4 and 5 indicate the corresponding parts of that which I designate for the purposes of distinction the "gaff-hook." The respective hooks may be of ordinary or preferred shape, terminating, respectively, at their ends opposite their hooked ends in rings or eyelets 17 and 14, except that each is provided with a hub (designated by the reference-numerals 8 and 9, respectively) by means whereof, as by a pin 7, passing through apertures in said hubs, the two hooks are pivotally united.

Coiled about the conjoined hubs 8 and 9, and preferably between the shanks 1 and 4, is a spring 10, the opposite ends of which respectively engage the shanks 1 and 4, as by loops 11 and 12. The effect of the spring 10 tends to normally hold the hooks 2 and 5 asunder, as illustrated in Fig. 1, the ring 17 on the end of the shank 1 being located or deflected out of a straight line of the shank, so as to act as a stop mechanism against the relative movement of the two shanks when operated about their pivotal connection by the spring 10. Any other suitable stop mechanism may of course be substituted for that referred to.

The spring 10 being, as I have just specified, adapted to separate the hooks 2 and 5, I employ the usual line 15 as a positive means for causing coöperative action of the hooks through the downward or closing movement of the gaff-hook, as shown in dotted lines in Fig. 1. To accomplish this result, it is only necessary to securely fix the end of the line 15 to the ring 14 and to pass the line loosely through the ring 17.

In practice the shank 1 hangs substantially in vertical alinement with the line 15. A vigorous pull upon the hook 2 causes the line to draw the ring 14 toward the ring 17, and thereby to sharply and operatively actuate the gaff-hook.

What I claim is—

1. The combination with a pendent hook and a gaff-hook provided respectively with shanks terminating in opposite ends respectively in hooks and rings, means of pivotal connection uniting the shanks of said hooks, and a spring disposed about the pivotal connection and adapted to keep the hooked ends open and opposed to each other, substantially as set forth.

2. The combination with a pair of pivotally-united hooks and a spring upon the pivotal connection, of means for actuating one hook against the force of the spring, by a pull upon the other hook.

In testimony of all which I have hereunto subscribed my name.

FRANK H. PARDON.

Witnesses:
M. GANT,
H. B. ENGLES.